US010754668B2

(12) United States Patent
 Xu et al.

(10) Patent No.: US 10,754,668 B2
(45) Date of Patent: Aug. 25, 2020

(54) MEDIA FILE PRESENTATION METHOD, CLIENT APPLICATION, AND PLUG-IN

(71) Applicant: Tencent Technology (Shenzhen) Company Limited, Shenzhen, Guangdong (CN)

(72) Inventors: Gang Xu, Guangdong (CN); Ping Wang, Guangdong (CN); Lin Pei, Guangdong (CN); Dan Yang, Guangdong (CN); Xian Jun Wang, Guangdong (CN); Yi Xie, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 189 days.

(21) Appl. No.: 15/982,249

(22) Filed: May 17, 2018

(65) Prior Publication Data
 US 2018/0267815 A1 Sep. 20, 2018

Related U.S. Application Data

(63) Continuation of application No. PCT/CN2017/083413, filed on May 8, 2017.

(30) Foreign Application Priority Data

May 6, 2016 (CN) .......................... 2016 1 0298190

(51) Int. Cl.
 *G06F 15/16* (2006.01)
 *G06F 9/445* (2018.01)
 (Continued)

(52) U.S. Cl.
 CPC ............ *G06F 9/44526* (2013.01); *G06F 8/61* (2013.01); *G06F 16/40* (2019.01); *G06F 16/438* (2019.01); *H04L 67/06* (2013.01); *H04L 67/36* (2013.01)

(58) Field of Classification Search
 CPC .... G06F 9/44526; G06F 16/40; G06F 16/438; G06F 8/61; H04L 67/06; H04L 67/36
 (Continued)

(56) References Cited

U.S. PATENT DOCUMENTS 6,188,398 B1 * 2/2001 Collins-Rector ...... G06Q 30/02
 348/E5.104
6,279,036 B1 * 8/2001 Himmel .............. G06F 11/3419
 705/14.73
 (Continued)

FOREIGN PATENT DOCUMENTS

CN  103297841 A  9/2013
CN  104023271 A  9/2014
 (Continued)

OTHER PUBLICATIONS

International Search Report and Written Opinion dated Jul. 28, 2017 for PCT Application No. PCT/CN2017/083413, 20 pages.

*Primary Examiner* — Anthony Mejia
(74) *Attorney, Agent, or Firm* — Brinks Gilson & Lione

(57) ABSTRACT

This application discloses a media file presentation method, a client application, and a plug-in. The method includes: sending a media information obtaining request to a plug-in installed in the client application, so that the plug-in obtains first brief information and second brief information of a media file from a server based on the media information obtaining request; and receiving a notification message for the media file from the plug-in; and presenting the first brief information at a first presentation position according to the notification message, and then presenting the second brief
(Continued)

information at a second presentation position, the media file being obtained and presented when an operation performed by a user on the second brief information is received.

14 Claims, 9 Drawing Sheets

(51) Int. Cl.
  *G06F 16/40*   (2019.01)
  *G06F 16/438*  (2019.01)
  *H04L 29/08*   (2006.01)
  *G06F 8/61*    (2018.01)

(58) Field of Classification Search
  USPC .......................................................... 709/203
  See application file for complete search history.

(56) References Cited

U.S. PATENT DOCUMENTS

| | | | |
|---|---|---|---|
| 7,490,288 B2* | 2/2009 | Undasan | G06F 3/0481 715/201 |
| 7,814,421 B2* | 10/2010 | Reynolds | H04N 5/44543 348/563 |
| 2003/0028622 A1* | 2/2003 | Inoue | H04L 63/10 709/219 |
| 2006/0212347 A1* | 9/2006 | Fang | H04L 67/289 705/14.61 |
| 2008/0092071 A1 | 4/2008 | Chiu | |
| 2008/0168387 A1* | 7/2008 | Brownrigg | G06F 3/0483 715/799 |
| 2008/0307458 A1* | 12/2008 | Kim | H04N 21/4347 725/38 |
| 2009/0106104 A1* | 4/2009 | Upendran | H04N 21/4312 705/14.5 |
| 2010/0146379 A1* | 6/2010 | George | G06F 40/14 715/234 |
| 2011/0191151 A1* | 8/2011 | Rosa | G06Q 30/02 705/14.1 |
| 2012/0290933 A1* | 11/2012 | Rajaraman | G06F 16/7328 715/719 |
| 2013/0080895 A1* | 3/2013 | Rossman | G06F 3/04883 715/720 |
| 2013/0139199 A1* | 5/2013 | Lee | H04N 21/435 725/40 |
| 2014/0074971 A1* | 3/2014 | Zhang | H04L 67/02 709/217 |
| 2014/0282014 A1* | 9/2014 | Lee | G06F 9/44526 715/733 |
| 2015/0012924 A1* | 1/2015 | Liu | G06F 9/44526 719/318 |
| 2015/0112798 A1* | 4/2015 | Wu | H04L 67/303 705/14.49 |
| 2015/0161277 A1* | 6/2015 | Heller | G06F 9/44526 715/229 |
| 2016/0117092 A1* | 4/2016 | Wang | G06F 3/0482 715/786 |
| 2016/0134900 A1* | 5/2016 | Wei | H04N 21/85406 725/32 |

FOREIGN PATENT DOCUMENTS

| | | |
|---|---|---|
| CN | 104166931 A | 11/2014 |
| CN | 104462535 A | 3/2015 |
| CN | 104703014 A | 6/2015 |
| CN | 105472033 A | 4/2016 |
| CN | 106059999 A | 10/2016 |

\* cited by examiner

MEDIA FILE PRESENTATION METHOD, CLIENT APPLICATION, AND PLUG-IN

RELATED APPLICATION

This application is a continuation of International Patent Application No. PCT/CN2017/083413, filed on May 8, 2017, which claims priority to Chinese Patent Application No. 201610298190.9, filed with the Chinese Patent Office on May 6, 2016 and entitled "MEDIA FILE PRESENTATION METHOD, CLIENT APPLICATION, PLUG-IN, AND SYSTEM", the entirety of all of which are hereby incorporated by reference herein.

FIELD OF THE TECHNOLOGY

This application relates to the field of Internet technologies, and in particular, to a media file presentation method, a client application, and a plug-in.

BACKGROUND OF THE DISCLOSURE

Based on rapid development of intelligent terminals, a user may install various application programs (APP) on an intelligent terminal, to browse or view various media files. When the user opens an APP on the intelligent terminal for the first time, a type of information about a media file is pushed to a user. For example, a static advertisement picture is presented, an advertisement video is played, a public service propaganda film is played, and so on. After the presentation of this media information is complete, a main interface of the APP is displayed.

SUMMARY

This application provides a media file presentation method, applied to a client application device for presenting a media file to a user of the client application, the method including: sending a media information obtaining request to a plug-in installed in the client application, so that the plug-in obtains first brief information and second brief information of a media file from a server based on the media information obtaining request; and receiving a notification message for the media file from the plug-in; and presenting the first brief information at a first presentation position according to the notification message, and then presenting the second brief information at a second presentation position, the media file being obtained and presented when an operation performed by a user on the second brief information is received.

This application further provides a media file presentation method, applied to a plug-in installed in a client application, the method including receiving a media information obtaining request sent by the client application; obtaining first brief information and second brief information of a media file from a server based on the media information obtaining request; and sending a notification message for the media file to the client application, so that the client application presents the first brief information at a first presentation position according to the notification message, and then presents the second brief information at a second presentation position, the media file being obtained and presented when an operation performed by a user on the second brief information is received.

This application further provides a client application including: a sending module, configured to send a media information obtaining request to a plug-in installed in the client application, so that the plug-in obtains first brief information and second brief information of a media file from a server based on the media information obtaining request; a receiving module, configured to receive a notification message for the media file from the plug-in; and a presentation module, configured to: present the first brief information at a first presentation position according to the notification message received by the receiving module, and then present the second brief information at a second presentation position, the media file being obtained and presented when an operation performed by a user on the second brief information is received.

This application further provides a plug-in application, the plug-in application being installed in a client application, and including: a receiving module, configured to receive a media information obtaining request sent by the client application; an obtaining module, configured to obtain first brief information and second brief information of a media file from a server based on the media information obtaining request received by the receiving module; and a sending module, configured to send a notification message for the media file to the client application, so that the client application presents the first brief information at a first presentation position according to the notification message, and then presents the second brief information at a second presentation position, the media file being obtained and presented when an operation performed by a user on the second brief information is received.

This application further provides a non-volatile computer readable storage medium, storing processor-executable instructions that, when executed by a processor, cause at least one processor to perform the features described herein.

BRIEF DESCRIPTION OF THE DRAWINGS

To describe the technical solutions in the embodiments of this application more clearly, the following briefly describes the accompanying drawings required for describing the embodiments. Accordingly, the accompanying drawings in the following description show some embodiments of the features described herein, and a person of ordinary skill in the art may still derive other drawings from these accompanying drawings without creative efforts.

DETAILED DESCRIPTION

The following clearly and completely describes the technical solutions in the embodiments of this application with reference to the accompanying drawings in the embodiments of this application. Accordingly, the described embodiments are some embodiments of this application rather than all of the embodiments. All other embodiments obtained by persons skilled in the art based on the embodiments of this application without creative efforts fall within the protection scope of this application.

In some embodiments, a to-be-presented media file does not have a promotion function. After a user opens an APP for the first time and presentation of media information is complete, the media information is not visible to the user any longer. That is, the user cannot click the media information to know about more content of the corresponding media file, or perform any interaction for the media information. Therefore, experience of the user is not good, and a resource usage rate of a terminal device is reduced. Therefore, a promotion effect and a presentation effect of this media file need to be improved.

In some embodiments, a to-be-presented media file has a promotion function, and is different from a common video file, such as a movie or a TV series. The to-be-presented media file may be a native advertisement provided by an advertiser, that is, an advertisement video that is not associated with another media file and is intended to promote a product. Alternatively, the to-be-presented media file is another video file with a purpose of promotion or broadcasting, such as a news media file or a public service media file.

In some embodiments, a process of presenting a media file includes a plurality of steps. First, when a client application is started, before a main interface of the client application is displayed, first brief information of the media file is presented. Then, second brief information of the media file is presented on the main interface, the user may click the two types of brief information, to display a media file landing page. Complete information, such as a video, quick response code, or a picture, of the media file is displayed on the landing page. During specific implementation, the first brief information may be referred to as a flash-screen advertisement, and the second brief information may be referred to as a flash-screen advertisement recovery position (or advertisement brief information presented in a flash-screen advertisement recovery position), and complete advertisement content is displayed on the media file landing page.

Figure 1:
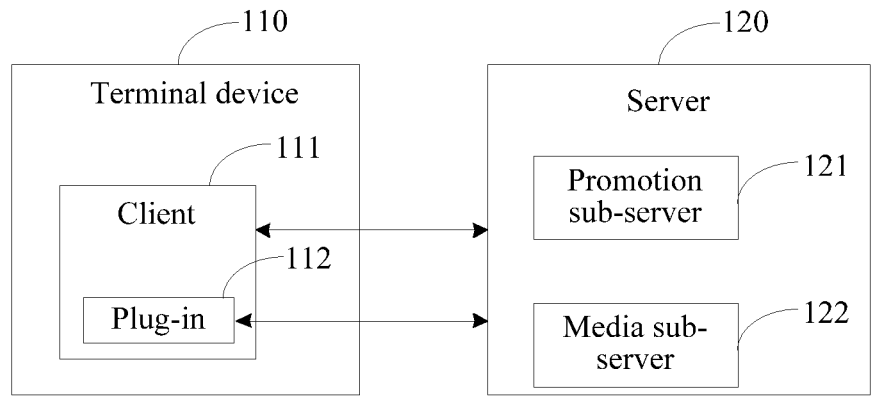
FIG. 1 shows a schematic structural diagram of an implementation environment according to an embodiment of this application.

FIG. 1 shows a schematic structural diagram of an implementation environment according to an embodiment of this application. As shown in FIG. 1, the implementation environment includes a terminal device 110 and a server 120. A client application 111 is included in the terminal device 110, and a plug-in 112 is installed on the client application 111. The server 120 includes a promotion sub-server 121 and a media sub-server 122.

When a media file is presented, a display interface for presenting the media file is provided on a screen of the terminal device 110. For example, the terminal device 110 is an intelligent television set, a smartphone, a tablet computer, a laptop portable computer, or the like. The client application 111 may be one or more of a media client application, software application, hardware components, circuitry, application programming interface, that is configured to control presentation of a media file on a display interface. For example, the client application 111 is a video APP such as Tencent Video, MangoTV, or iQIYI. The plug-in 112 is configured to: interact with the server, obtain various source materials of the media file, including two types of brief information and presentation control information (such as presentation duration), and forward the source materials to the client application 111. During specific implementation, the plug-in 112 may be used as an advertisement software development toolkit (SDK).

The server 120 may be a server, or a server cluster that includes several servers, or a cloud computing service center. According to different processing functions, the promotion sub-server 121 may be referred to as an order server, and configured to exchange advertisement order information with the plug-in 112; and the media sub-server 122 is also referred to as a source material server, and configured to send various advertisement source materials to the plug-in 112. In this embodiment of this application, when a user clicks either of the two types of brief information, the client application 111 requests a complete media file from the media sub-server 122. For example, an advertisement landing page is displayed to play a complete advertisement.

The terminal device 110 may be connected to the server 120 by using a wireless network or a wired network.

Figure 2A:
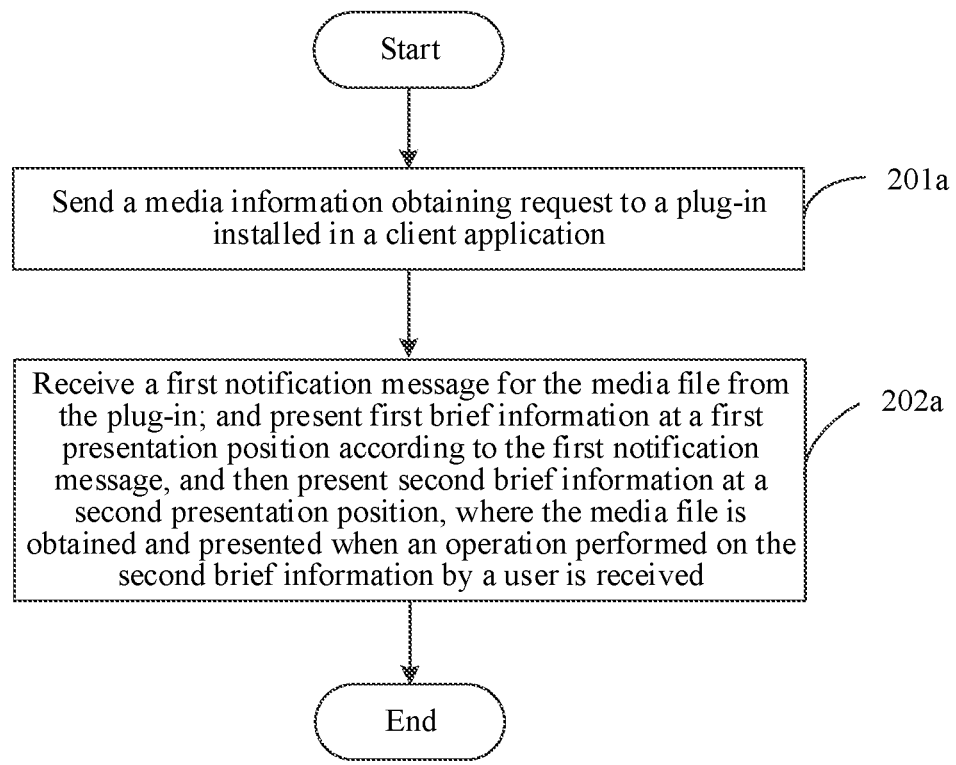
FIG. 2a shows an exemplary flowchart of a media file presentation method according to an embodiment of this application.

FIG. 2a shows an exemplary flowchart of a media file presentation method according to an embodiment of this application. The method is applied to a client application. As shown in FIG. 2a, the method may include the following steps:

Step 201a: Send a media information obtaining request to a plug-in installed in the client application, so that the plug-in obtains first brief information and second brief information of a media file from a server based on the media information obtaining request.

In this step, when the client application is started, the client application sends the media information obtaining request to the plug-in, for example, requests to play a flash-screen advertisement. In this case, after receiving the media information obtaining request, the plug-in request to obtain two types of brief information from the server, that is, first brief information and second brief information.

Both the first brief information and the second brief information are brief versions of media files, and a form thereof may be a picture (such as a thumbnail of a promotion video), a picture and a text (such as a thumbnail and an abstract of a promotion video), or a video file (such as a brief video of a promotion video). The second brief information may be a portion of the first brief information, for example, some characters in an abstract, or a portion of content in a thumbnail, or a screenshot of a video.

Step 202*a*: Receive a notification message for the media file from the plug-in; and present the first brief information at a first presentation position according to the notification message, and then present the second brief information at a second presentation position.

In this step, in terms of a chronological order of presentation, the first brief information is first presented, and then the second brief information is presented.

In terms of duration of presentation, the notification message includes first presentation duration of the first brief information and second presentation duration of the second brief information. In this way, the first brief information is presented within the first presentation duration, and the second brief information is presented within the second presentation duration. When the first presentation duration expires, the presentation of the first brief information is ended, and a main interface of the client application is displayed. When the second presentation duration expires, the second brief information disappears from the main interface. For example, the first presentation duration is five seconds, and the second presentation duration may be permanent presentation or a specific numerical value. In some embodiments, a timer is configured, and remaining presentation duration is presented when the first brief information is presented; when the second presentation duration is a specific numerical value, remaining presentation duration is presented when the second brief information is presented.

At a presentation position, the first presentation position may be a full-screen interface of a client application, and the second presentation position may be an advertisement position on a main interface of the client application. In this way, the first brief information is presented on the full-screen interface when the client application is started. The client application receives setting information of the second presentation position from the plug-in. The setting information includes a shape, a size, and a location of the second presentation position. Then, the client application determines, on the main interface of the client application, the second presentation position according to the setting information. For example, the shape is a strip, the size includes a length and a width of the strip, and the location is in a status bar of the main interface.

Figure 3A:
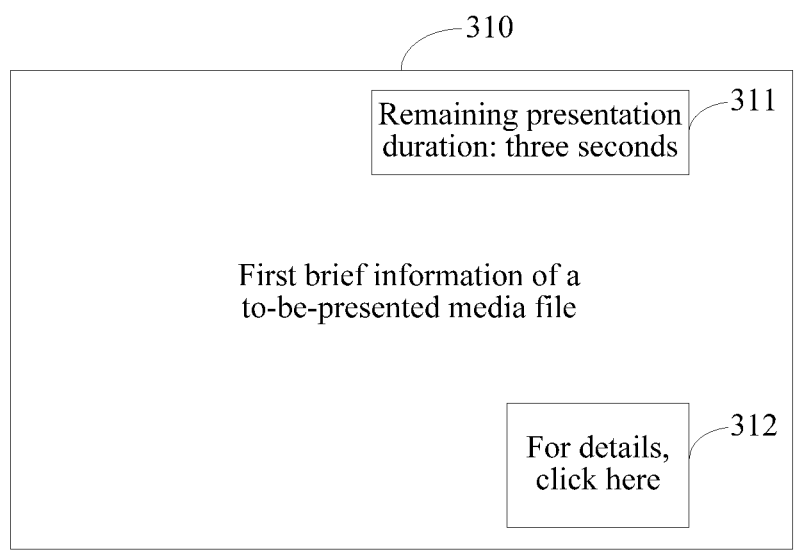
FIG. 3a shows a schematic diagram of an interface for presenting first brief information according to an embodiment of this application.

FIG. 3*a* shows a schematic diagram of an interface for presenting first brief information according to an embodiment of this application. As shown in FIG. 3*a*, the interface 310 is a full-screen interface, and first brief information of a to-be-presented media file is presented on the interface 310. For example, the to-be-presented media file is an advertisement, and is referred to as "MEIZU new year goods festival", and the first brief information is a brief video of the advertisement. Specifically, a user installs the client application (e.g., Tencent Video software) in an intelligent television set. After the user starts Tencent Video, a flash-screen advertisement, that is, the brief video of the advertisement "MEIZU new year goods festival" is played on a full-screen interface of the intelligent television set. In addition, remaining presentation duration, for example, three seconds, is displayed in a box 311. After playing of the brief video is complete, the interface is switched to a main interface of Tencent Video.

Figure 3B:
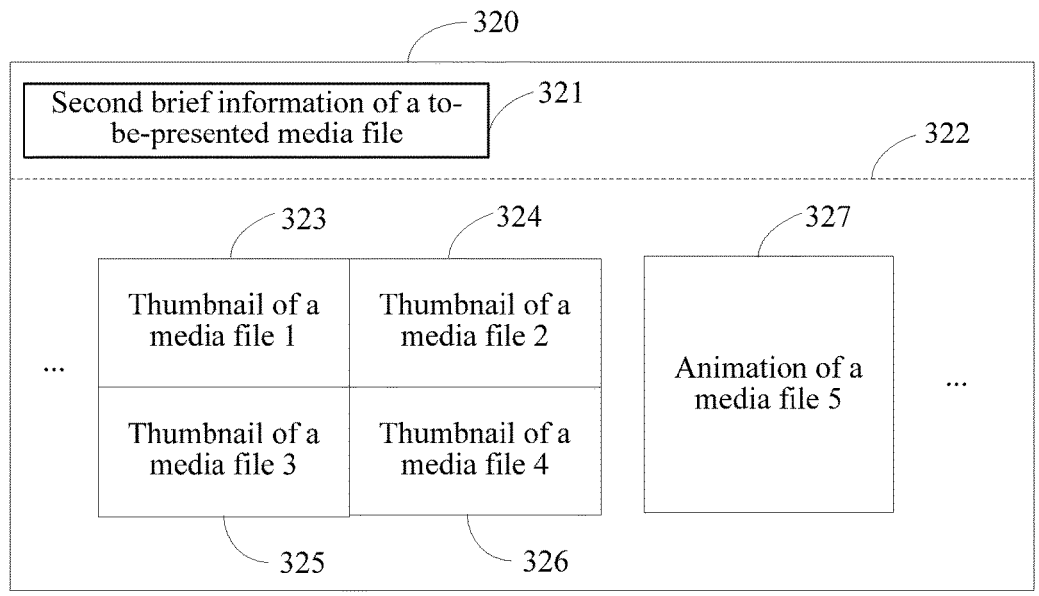
FIG. 3b shows a schematic diagram of an interface for presenting second brief information according to an embodiment of this application.

FIG. 3*b* shows a schematic diagram of an interface for presenting second brief information according to an embodiment of this application. As shown in FIG. 3*b*, an interface 320 is a main interface of Tencent Video; above a dashed line 322 is a status bar area; second brief information of a to-be-presented media file is presented in a box 321, for example, a screenshot of the foregoing flash-screen advertisement, or a screenshot of the foregoing flash-screen advertisement and characters "MEIZU new year goods festival". The second presentation duration is permanent presentation. Various information about a common media file may be displayed below the dashed line 322. For example, thumbnails of media files 1 to 4 are respectively displayed in boxes 323 to 326, and an animation of a media file 5 is displayed in a box 327.

Figure 2B:
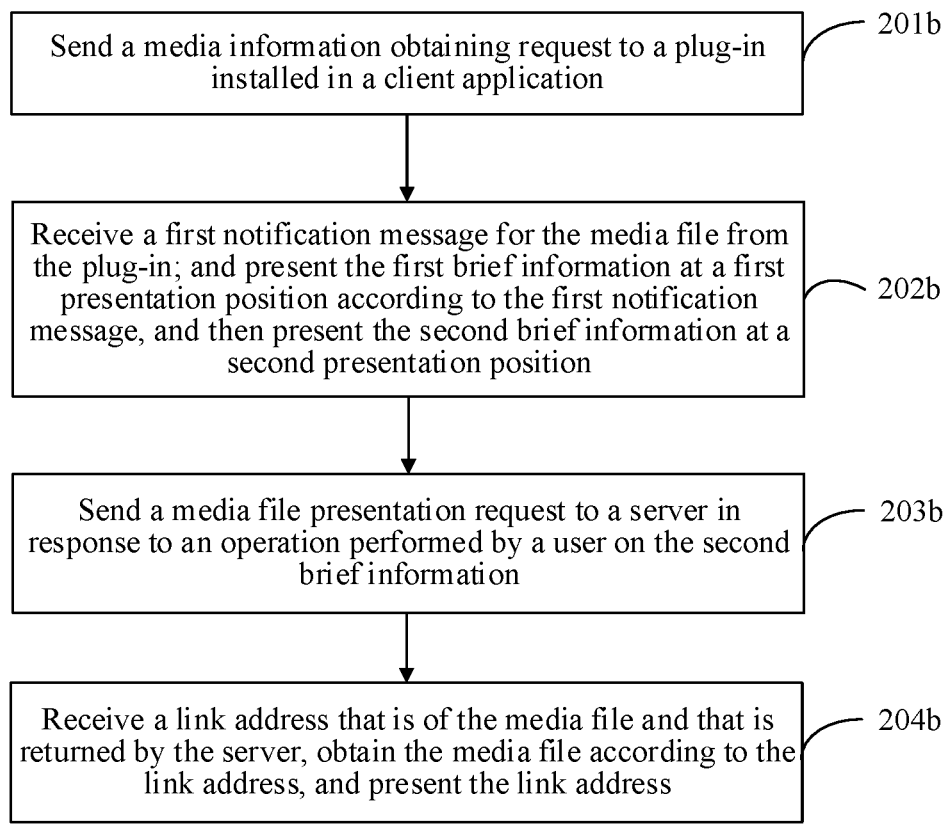
FIG. 2b shows an exemplary flowchart of a media file presentation method according to another embodiment of this application.

FIG. 2*b* is an exemplary flowchart of a media file presentation method according to another embodiment of this application. As shown in FIG. 2*b*, the method may include the following steps:

Step 201*b*: Send a media information obtaining request to a plug-in installed in a client application, so that the plug-in obtains first brief information and second brief information of a media file from a server based on the media information obtaining request.

Step 202*b*: Receive notification message for the media file from the plug-in; and present the first brief information at a first presentation position according to the notification message, and then present the second brief information at a second presentation position.

Step 203*b*: Send media file presentation request to a server in response to an operation performed by a user on the second brief information.

During specific implementation, the client application may directly send the media file presentation request to the server, or the client application may forward the media file presentation request to the server by using the plug-in.

Step 204*b*: Receive ink address that is of the media file and that is returned by the server, obtain the media file according to the link address, and present the link address.

Figure 3C:
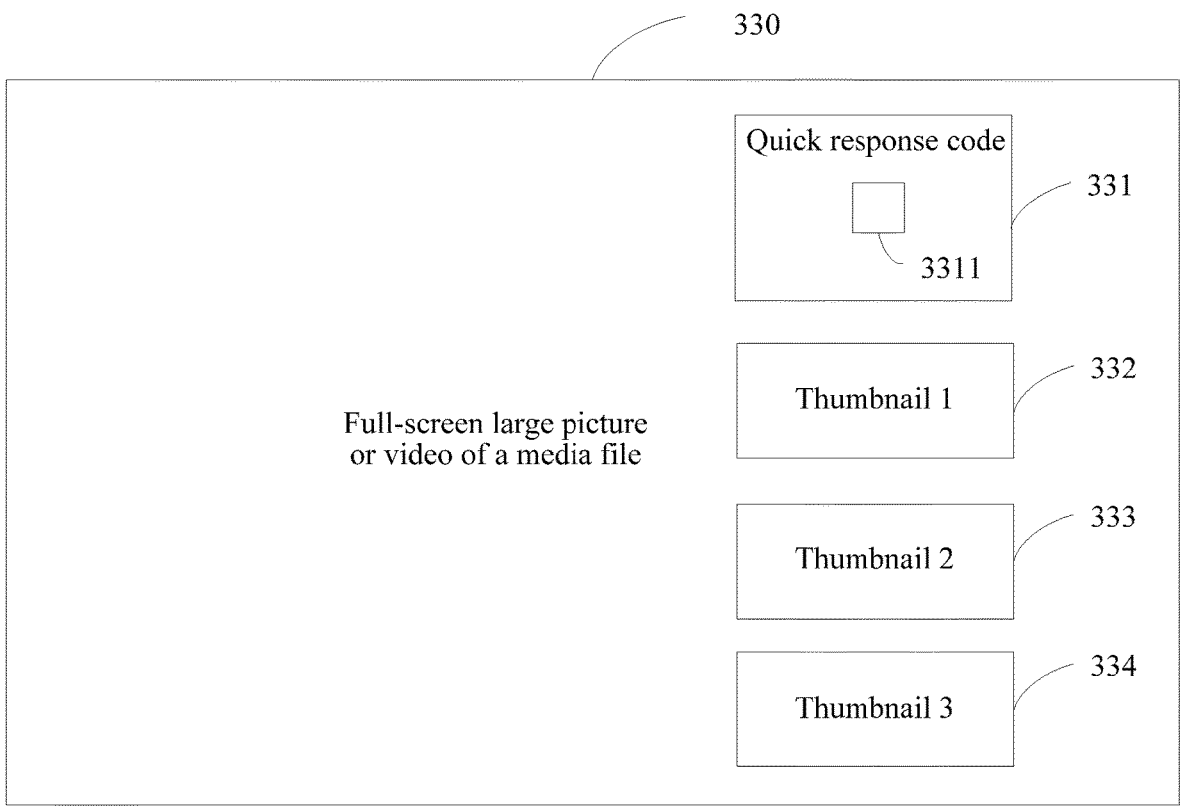
FIG. 3c shows a schematic diagram of an interface for presenting a media file according to an embodiment of this application.

In this step, content of the media file includes one or more full-screen large pictures, a video file, one or more thumbnails, quick response code, and the like. For example, in FIG. 3*b*, after the user clicks the box 321, a landing page for presenting the media file is displayed on the interface, as shown in FIG. 3*c*. FIG. 3*c* is a schematic diagram of an interface for presenting a media file according to an embodiment of this application. A full-screen large picture or a video of the media file is displayed on an interface 330. Quick response code of the media file is displayed in the box 331 by using a floating layer. Thumbnails 1 to 3 of the media file are respectively displayed in boxes 332 to 334. A small icon is further embedded in a center 3311 of the quick response code displayed in 331. An APP on a mobile intelligent device (such as a mobile phone) can obtain a URL of the landing page by scanning the quick response code, and can further present the landing page on the mobile intelligent device according to the URL. A placement manner of all content of the entire interface shown in FIG. 3*c* is referred to as a template, and is generated by the client application.

The content, including a full-screen large picture, a video, and a plurality of thumbnails, of the media file is uploaded by a media file provider (such as an advertiser) to the server, for example, uploaded to a media sub-server. For the quick response code in the box 331, an advertiser provides a quick response code address (that is, a landing page click address) and a small icon, and then the server generates the quick response code according to the quick response code address and the small icon.

When the client application directly sends the media file presentation request to the server, the server may return a Universal Resource Locator (URL) address to the client application as the link address. When the client application forwards the media file presentation request to the server by using the plug-in, the plug-in receives the URL address returned by the server, obtains the media file by using the URL address, and stores the media file into a buffer, and then the plug-in sends a buffer address of the media file to the client application, so that the client application obtains the media file according to the buffer address, and presents the media file.

Specifically, when the client application is in an intelligent television set, the application client application sends a media information obtaining request to a plug-in installed in the client application. The plug-in obtains first brief information (such as a full-screen large picture) and second brief information (such as a portion of a thumbnail) of the media file and the media file (such as a landing page) from the server based on the media information obtaining request. The media file includes a video, a plurality of thumbnails, quick response code of the media file, and the like. The plug-in receives the first brief information and the second brief information of the media file and the URL address of the media file that are returned by the server, and obtains the first brief information and the second brief information of the media file and the media file by using the URL address. Then, the plug-in sends the first brief information and the second brief information of the media file and the buffer address of the media file to the client application. The client application obtains the first brief information of the media file according to a buffer address of the first brief information of the media file and presents the buffer address at a first presentation position; and then obtains the second brief information of the media file according to a buffer address of the second brief information of the media file and presents the buffer address at a second presentation position (such as a flash-screen advertisement recovery position). When receiving an operation performed by the user on the second brief information (for example, the user clicks an area of the flash-screen advertisement recovery position), the client application obtains the media file according to the buffer address of the media file, and presents the media file on the intelligent television set. Optionally, when the client application presents the first brief information, when the client application receives a specified operation performed on the first brief information by the user, for example, the user clicks an option in a full-screen large picture (for example, clicks the box 312 in FIG. 3a), the client application may obtain the media file according to the buffer address of the media file, and present the media file (such as the landing page) on the intelligent television set. In this case, after the presentation of the first brief information is complete, it is not necessary to present the second brief information at the second presentation position. That is, after the landing page is opened on the intelligent television set by operating the full-screen large picture, it is not necessary to present the second brief information at the flash-screen recovery position that can be linked to the landing page.

In this embodiment, after the first brief information is presented at the first presentation position, the second brief information is presented at the second presentation position, and the media file presentation request is sent to the server in response to the operation performed on the second brief information by the user, the link address of the media file returned by the server is received, the media file is obtained according to the link address, and the media file is presented. It can be seen that, the second brief information is associated with the first brief information, a user interaction behavior is introduced on the main interface of the client application by presenting the second brief information, so that after opening an APP and completing viewing of the first brief information (such as a flash-screen advertisement), the user can further obtain the complete media file (for example, view a complete advertisement). Therefore, a disadvantage in the existing technology that the user can only passively view the first brief information is eliminated, interest points of the user are further dug up, experience of the user for actively viewing an advertisement video is satisfied, and a resource usage rate for media file presentation by the client application is improved by means of interaction between the plug-in, the server, and the client application.

Figure 4:
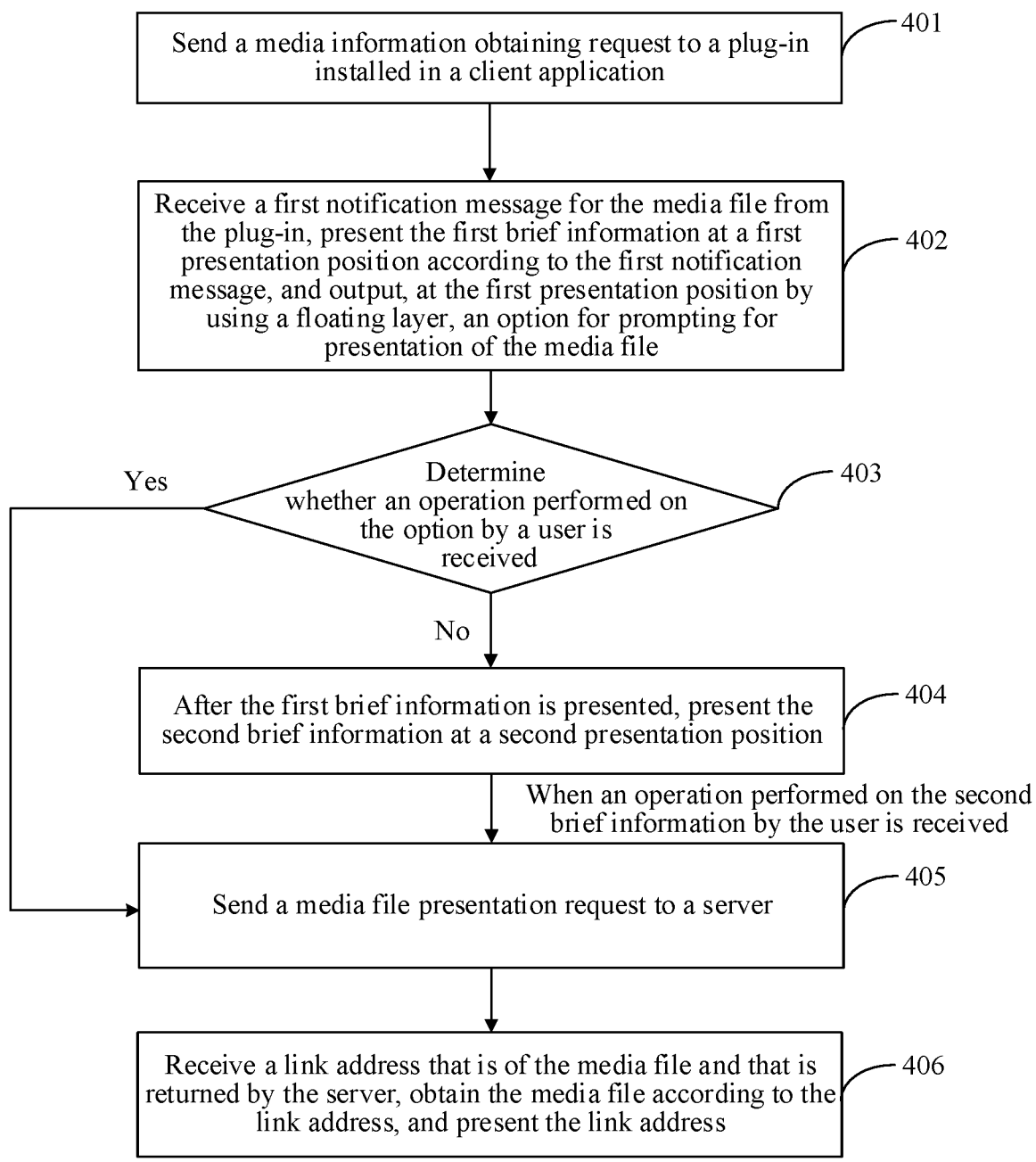
FIG. 4 shows an exemplary flowchart of a media file presentation method according to another embodiment of this application.

FIG. 4 shows an exemplary flowchart of a media file presentation method according to another embodiment of this application. The method is applied to a client application. As shown in FIG. 4, the method may include the following steps:

Step 401: Send a media information obtaining request to a plug-in installed in the client application, so that the plug-in obtains first brief information and second brief information of a media file from a server based on the media information obtaining request.

Step 402: Receive a notification message for the media file from the plug-in, present the first brief information at a first presentation position according to the notification message, and output, at the first presentation position by using a floating layer, an option for prompting for presentation of the media file.

As shown in FIG. 3a, "For details, click here" is displayed in the box 312, that is, a user is prompted that the option shown in 312 may be clicked if the user needs to view a complete media file. During specific implementation, when a display terminal is an intelligent television set, a floating layer may be output at the box 312. A picture of a remote controller is displayed on the floating layer, together with texts "Click the OK key for more", so as to prompt the user that a corresponding media file may be further viewed when the first brief information is displayed.

In this step, the client application may obtain the first brief information and the second brief information according to the notification message, and there are the following two specific obtaining manners:

Manner 1: The notification message carries the first brief information and the second brief information, and in this way, after receiving the notification message, the client application directly reads the first brief information and the second brief information from the notification message, and separately presents the first brief information and the second brief information.

Manner 2: As described in step 204 if plug-in stores the first brief information and the second brief information obtained from the server into the buffer, the notification message sent by the plug-in to the client application may carry buffer addresses of the first brief information and the second brief information; in this case, the client application reads the first brief information from the notification message and presents the first brief information, and obtains the second brief information according to the buffer addresses after presenting the first brief information.

Step 403: Determine whether an operation performed on the option by a user is received. If the operation is received, perform step 405; or if the operation is not received, perform step 404.

Step 404: After the first brief information is presented, present the second brief information at a second presentation position. When an operation performed on the second brief information by the user is received, further perform step 405.

Step 405: Send a media file presentation request to the server.

Step 406: Receive a link address that is of the media file and that is returned by the server, obtain the media file according to the link address, and present the link address.

According to the foregoing embodiment, the first brief information is presented, the option for prompting for presentation of the media file is output, and then the second brief information is presented. Click paths are configured in both the steps, for the user to click the option or the second brief information, so as to display the landing page to view the complete media file, so that viewing requirements of the user for the media file at different moments can be satisfied, and a resource usage rate of the client application can be improved.

Figure 5:
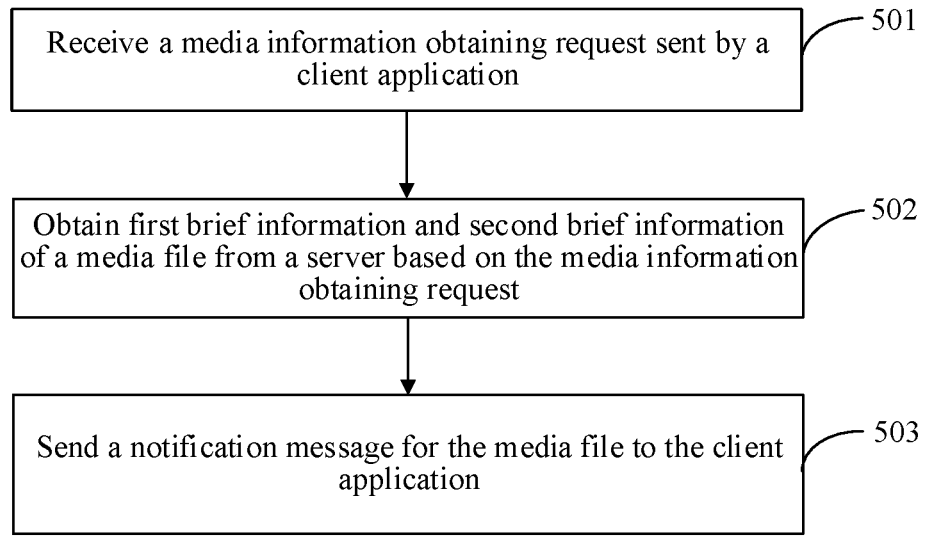
FIG. 5 shows an exemplary flowchart of a media file presentation method according to an embodiment of this application.

FIG. 5 shows an exemplary flowchart of a media file presentation method according to an embodiment of this application. The method is applied to a plug-in installed in a client application. As shown in FIG. 5, the method includes the following steps:

Step 501: Receive a media information obtaining request sent by the client application.

Step 502: Obtain first brief information and second brief information of a media file from a server based on the media information obtaining request.

For a manner in which the plug-in requests to obtain brief information from the server, the obtaining is performed for different quantities of times in the following two cases. Specifically:

Case 1: When the client application is started each time, presented first brief information is different.

In this case, when receiving the media information obtaining request each time, the plug-in requests to obtain first brief information and second brief information of a media file from the server.

Case 2: When the client application is started each time, presented first brief information is the same.

In this case, requesting to obtaining brief information from the server by the plug-in occurs only when the client application is started for the first time. Specifically, after the client application is installed in a terminal, when a user starts the client application for the first time, the client application sends the media information obtaining request to the plug-in for the first time, and the plug-in requests to obtain first brief information and second brief information of a media file from the server. In addition, the plug-in may return an instruction to the client application, indicating that no media information is available for presentation, for example, instruct the client application to continue a starting process without a flash-screen advertisement. In addition, the plug-in stores the obtained first brief information and second brief information into a buffer. In this way, when the client application is subsequently started and sends a media information obtaining request to the plug-in, the plug-in may read the previously stored brief information from the buffer.

In addition, for a way in which the plug-in requests to obtain brief information from the server, there are the following two manners:

Manner 1: The plug-in may directly obtain first brief information and second brief information from the server.

Manner 2: The plug-in receives a link address of the first brief information and a link address of the second brief information, and the link addresses of the two types of brief information may be URL addresses. Then, the plug-in pulls the first brief information from the server according to the link address of the first brief information, and pulls the second brief information from the server according to the link address of the second brief information.

Step 503: Send a notification message for the media file to the client application.

In this way, after presenting the first brief information at a first presentation position according to the notification message, the client application presents the second brief information at a second presentation position, sends a media file presentation request to the server in response to an operation performed on the second brief information by the user, receives the link address that is of the media file and that is returned by the server, and obtains the media file according to the link address and presents the media file.

According to this embodiment, the plug-in transmits information between the client application and the server. The plug-in requests the first brief information and the second brief information from the server, and then transmits the first brief information and the second brief information to the client application for display, so that the plug-in may perform processing jointly with a plurality of client applications, reducing a process of obtaining brief information by the client application, and improving a resource usage rate of the client application.

Figure 6:
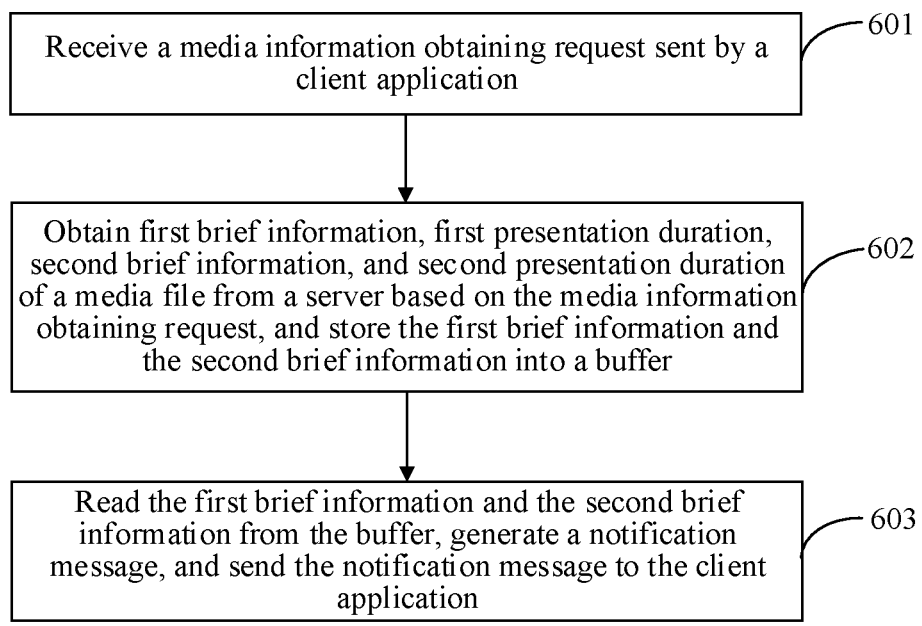
FIG. 6 shows an exemplary flowchart of a media file presentation method according to another embodiment of this application.

FIG. 6 shows an exemplary flowchart of a media file presentation method according to another embodiment of this application. The method is applied to a plug-in installed in a client application. As shown in FIG. 6, the method includes the following steps:

Step 601: Receive a media information obtaining request sent by the client application.

Step 602: Obtain first brief information, first presentation duration, second brief information, and second presentation duration of a media file from a server based on the media information obtaining request, and store the first brief information and the second brief information into a buffer.

Step 603: Read the first brief information and the second brief information from the buffer, generate a notification message, and send the notification message to the client application.

In some embodiments, the notification message carries buffer addresses of the first brief information and the second brief information, so that after reading the first brief information from the notification message and presenting the first brief information, the client application obtains the second brief information according to the buffer addresses and presents the second brief information. In addition, the notification message carries the first presentation duration and the second presentation duration, so that the client application presents the first brief information according to the first presentation duration, and presents the second brief information according to the second presentation duration.

Figure 7:
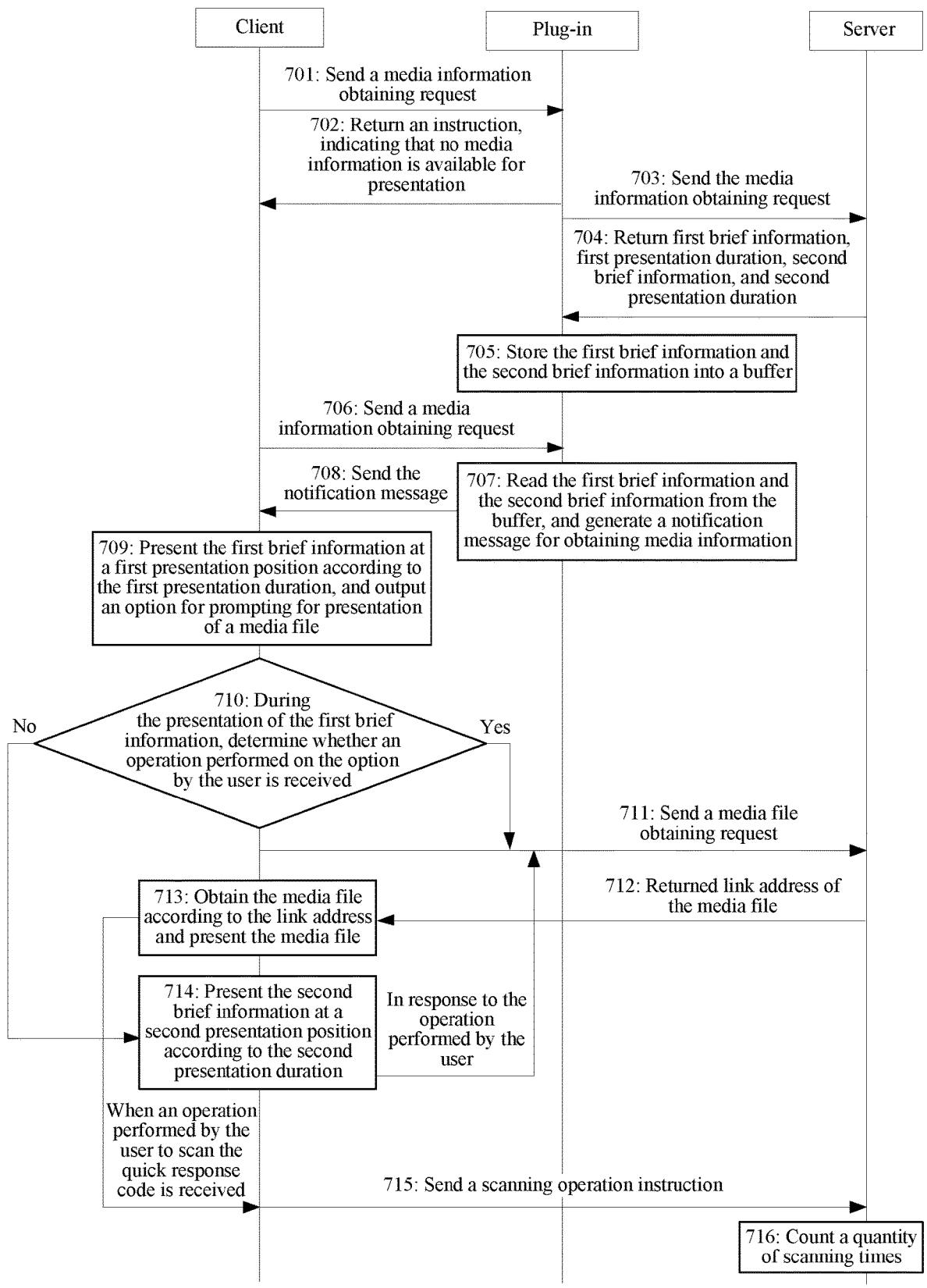
FIG. 7 shows an interaction flowchart of a media file presentation method according to an embodiment of this application.

FIG. 7 shows an interaction flowchart of a media file presentation method according to an embodiment of this application. The interaction flowchart includes interaction between a client application, a plug-in, and a server. Specifically, the following steps are included:

Step 701: When the client application is started for the first time, the client application sends a media information obtaining request to the plug-in.

Step 702: The plug-in returns an instruction to the client application, indicating that no media information is available for presentation.

Step 703: The plug-in sends the media information obtaining request to the server.

The plug-in may first perform step 703, and then perform step 702.

Step 704: The server returns first brief information, first presentation duration, second brief information, and second presentation duration to the plug-in.

During specific implementation, the client application requests a flash-screen advertisement from the plug-in. In this case, the plug-in does not have a buffered advertisement order locally. Then, the plug-in returns an instruction to the client application, indicating that no media information is available for presentation, that is, notifies the client application that there is no flash-screen advertisement, and a main interface is directly displayed. The plug-in also obtains a flash-screen advertisement order from the server, and extracts order information from the order, that is, a link address and presentation duration of the first brief information (that is, the flash-screen advertisement) and a link address and presentation duration of the second brief information (that is, a flash-screen advertisement recovery position).

Step 705: The plug-in stores the first brief information and the second brief information into a buffer.

Step 706: When the client application is subsequently started, the client application sends a media information obtaining request to the plug-in.

Step 707: The plug-in reads the first brief information and the second brief information from the buffer, and generates a notification message for obtaining media information.

The notification message the first brief information, the first presentation duration, a buffer address of the second brief information, and the second presentation duration. The first brief information and the first presentation duration may be used by the client application for direct presentation. The buffer address of the second brief information is used by the client application to obtain the second brief information.

Step 708: The plug-in sends the notification message for obtaining media information to the client application.

Step 709: The client application presents the first brief information at a first presentation position according to the first presentation duration, and outputs an option for prompting for presentation of a media file.

Step 710: During the presentation of the first brief information, the client application determines whether an operation performed on the option by the user is received. If the operation is received, perform step 711; or if the operation is not received, perform step 714.

Step 711: The client application sends a media file obtaining request to the server.

Step 712: The server returns a link address of the media file to the client application.

Step 713: The client application obtains the media file according to the link address and presents the media file.

The presented media file includes a full-screen large picture, a video, a plurality of thumbnails, quick response code, and the like.

Step 714: After presenting the first brief information, the client application presents the second brief information at a second presentation position according to the second presentation duration.

During specific implementation, after the flash-screen advertisement is ended, the second brief information is presented at a banner advertisement position in a status bar on the main interface of the client application.

Then, the client application performs steps 711 to 713 in response to an operation performed on the second brief information by the user. When receiving an operation performed by the user to scan the quick response code, the client application performs step 715.

Step 715: The client application sends a scanning operation instruction to the server.

Step 716: The server counts a quantity of scanning times according to the received scanning operation instruction.

Data about the quantity of times may be used for charging an advertiser. For example, selling may be performed in a Cost Per Mille (CPM) manner by means of advance payment.

Figure 8:
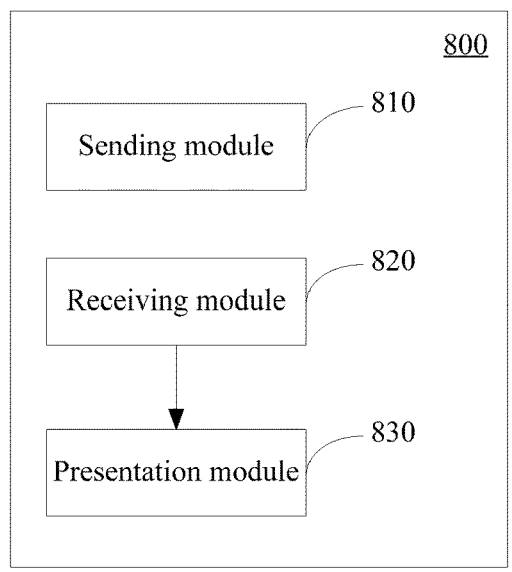
FIG. 8 shows a schematic structural diagram of a client application according to an embodiment of this application.

FIG. 8 shows a schematic structural diagram of a client application 800 according to an embodiment of this application. As shown in FIG. 8, the client application 800 includes: a sending module 810, configured to send a media information obtaining request to a plug-in installed in the client application, so that the plug-in obtains first brief information and second brief information of a media file from a server based on the media information obtaining request; a receiving module 820, configured to receive a notification message for the media file from the plug-in; and a presentation module 830, configured to: present the first brief information at a first presentation position according to the notification message received by the receiving module 820, and then present the second brief information at a second presentation position, where the media file is obtained and presented when an operation performed by a user on the second brief information is received. A module described herein may represent hardware, software, circuitry, API, or a combination thereof for implementing the attributed features.

In some embodiments, the notification message carries buffer addresses of the first brief information and the second brief information; the presentation module 830 is configured to: read the first brief information from the notification message, and after presenting the first brief information, obtain the second brief information according to the buffer addresses and present the second brief information.

In some embodiments, the notification message includes first presentation duration of the first brief information and second presentation duration of the second brief information; the presentation module 830 is configured to: present the first brief information according to the first presentation duration; and present the second brief information according to the second presentation duration.

In some embodiments, the presentation module 830 is further configured to: output, when the first brief information is presented, at the first presentation position by using a floating layer, an option for prompting for presentation of the media file, where if an operation performed by the user on the option is received, the presentation module 830 is instructed to obtain and present the media file, the second brief information is no longer presented; or if an operation performed by the user on the option is not received, the second brief information is presented at the second presentation position after the first brief information is presented.

In some embodiments, the first presentation position is a full-screen interface of the client application, and the presentation module 830 is configured to: present the first brief information on the full-screen interface when the client application is started; and receive setting information of the second presentation position from the plug-in, and determine the second presentation position on a main window of the client application according to the setting information.

Figure 9:
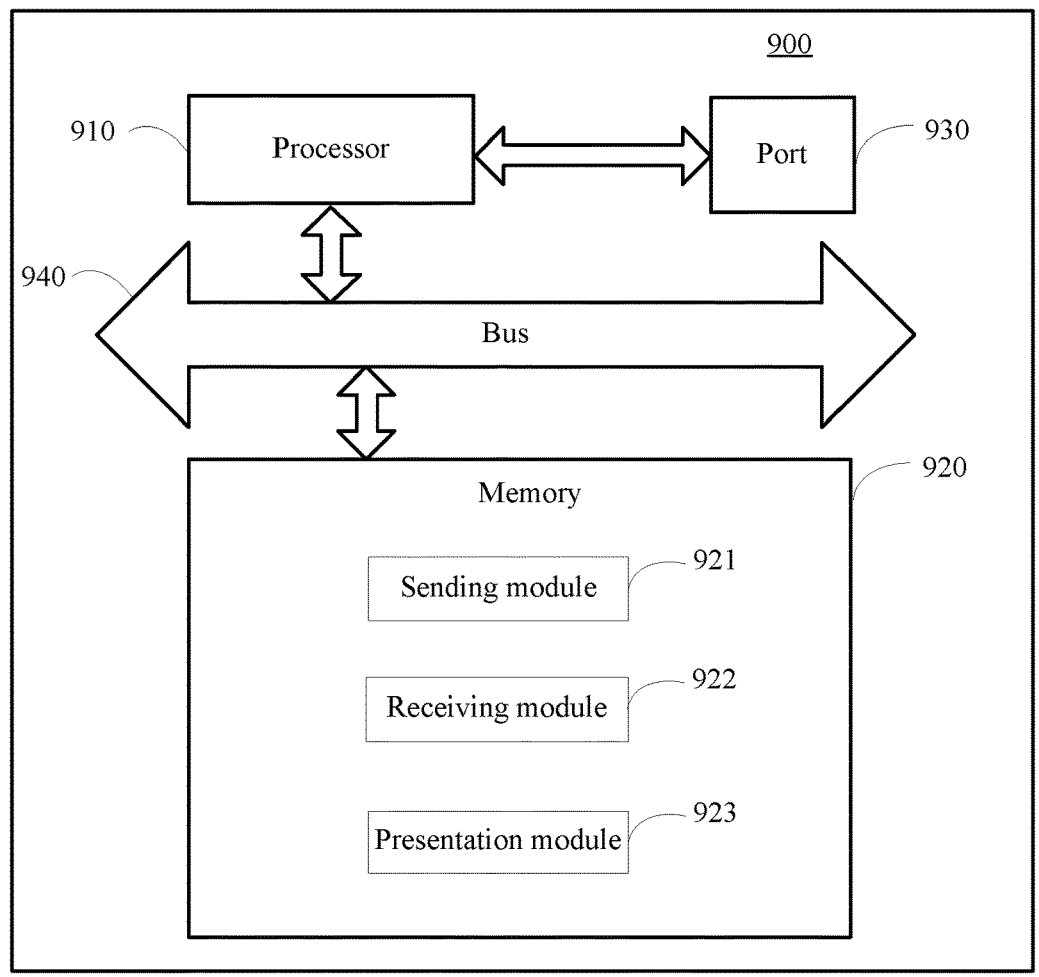
FIG. 9 shows a schematic structural diagram of a client application according to another embodiment of this application.

FIG. 9 is a schematic structural diagram of a client application 900 according to another embodiment of this application. The client application 900 may include: a processor 910, a memory 920, a port 930, and a bus 940. The processor 910 and the memory 920 are interconnected by using the bus 940. The processor 910 can receive and send data by using the port 930, where, the processor 910 is configured to execute machine readable instruction modules stored in the memory 920; the memory 920 stores the machine readable instruction modules that can be executed by the processor 910; and the instruction modules that can be executed by the processor 910 include: a sending module 921, a receiving module 922, and a presentation module 923, where, when being executed by the processor 910, the sending module 921 may: send a media information obtaining request to a plug-in installed in the client application, so that the plug-in obtains first brief information and second brief information of a media file from a server based on the media information obtaining request; when being executed by the processor 910, the receiving module 922 may: receive a notification message for the media file from the plug-in; and when being executed by the processor 910, the presentation module 923 may: present the first brief information at a first presentation position according to the notification message received by the receiving module 922, and then present the second brief information at a second presentation position, the media file being obtained and presented when an operation performed by a user on the second brief information is received.

Therefore, it can be seen that, when being executed by the processor 910, the instruction modules stored in the memory 920 can implement various functions of the sending module, the receiving module, and the presentation module in the foregoing embodiments.

Figure 10:
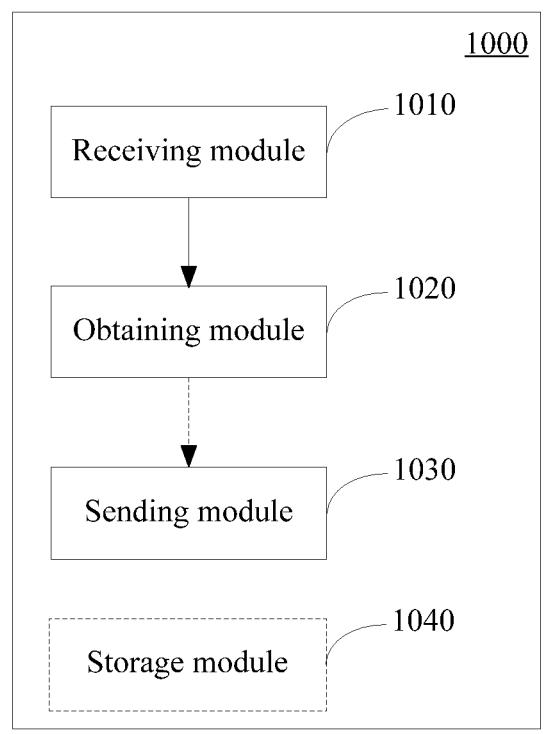
FIG. 10 shows a schematic structural diagram of a plug-in according to an embodiment of this application.

FIG. 10 shows a schematic structural diagram of a plug-in 1000 according to an embodiment of this application. As shown in FIG. 10, the plug-in 1000 includes: a receiving module 1010, configured to receive a media information obtaining request sent by the client application; an obtaining module 1020, configured to obtain first brief information and second brief information of a media file from a server based on the media information obtaining request received by the receiving module 1010; and a sending module 1030, configured to send a notification message for the media file to the client application, so that the client application presents the first brief information at a first presentation position according to the notification message, and then presents the second brief information at a second presentation position, the media file being obtained and presented when an operation performed by a user on the second brief information is received.

In some embodiments, the obtaining module 1020 is configured to: receive a link address of the first brief information and a link address of the second brief information from the server; pull the first brief information from the server according to the link address of the first brief information; and pull the second brief information from the server according to the link address of the second brief information.

In some embodiments, the obtaining module 1020 is further configured to obtain first brief information, first presentation duration, second brief information, and second presentation duration from the server. The notification message sent by the sending module 1030 carries the first presentation duration and the second presentation duration, so that the client application presents the first brief information according to the first presentation duration, and presents the second brief information according to the second presentation duration.

In some embodiments, the plug-in 1000 further includes a storage module 1040, where, the storage module 1040 is configured to store the first brief information and the second brief information into a buffer; and the sending module 1030 is configured to: read the first brief information and the second brief information from the buffer, and generate the notification message.

Figure 11:
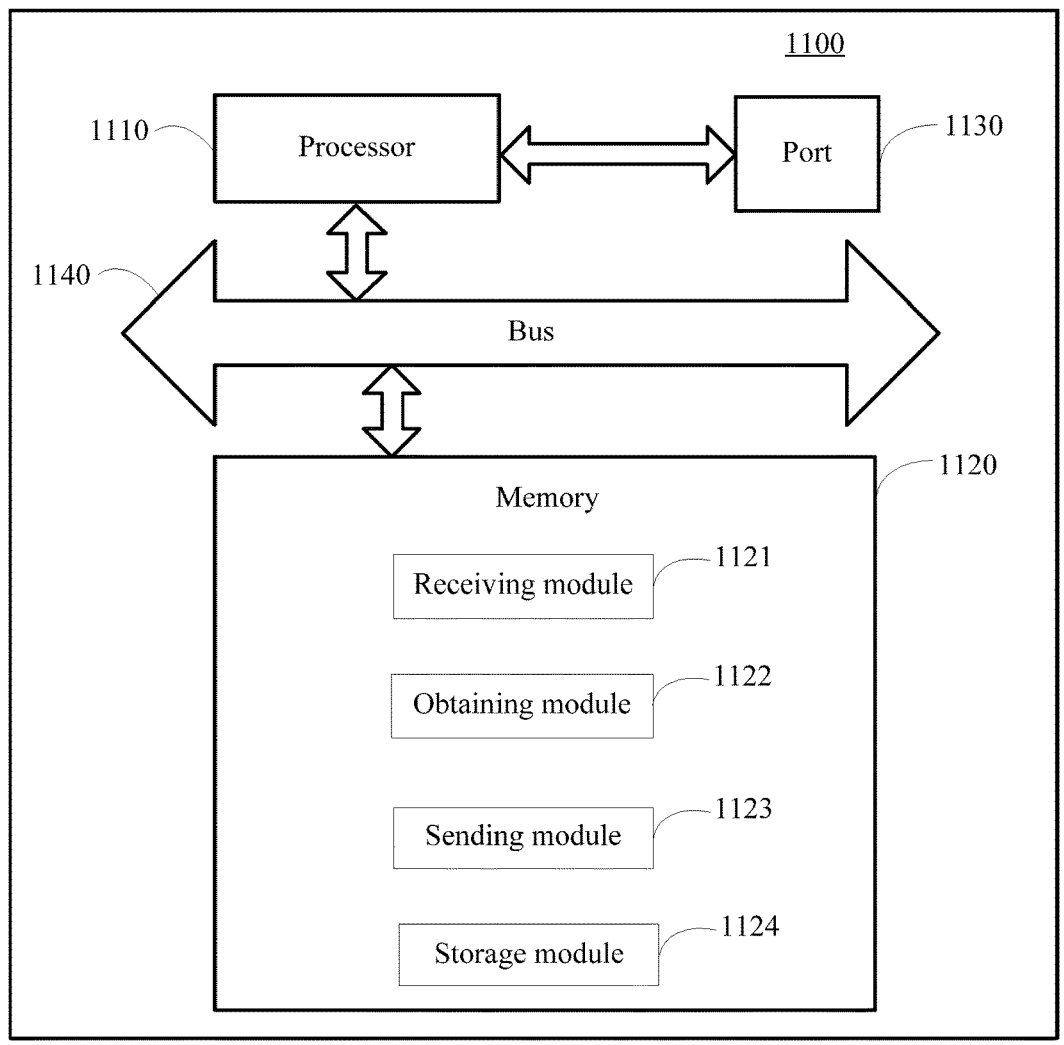
FIG. 11 shows a schematic structural diagram of a plug-in according to another embodiment of this application.

FIG. 11 shows a schematic structural diagram of a plug-in 1100 according to another embodiment of this application. The server 1100 may include: a processor 1110, a memory 1120, a port 1130, and a bus 1140. The processor 1110 and the memory 1120 are interconnected by using the bus 1140. The processor 1110 can receive and send data by using the port 1130, where, the processor 1110 is configured to execute machine readable instruction modules stored in the memory 1120; and the memory 1120 stores the machine readable instruction modules that can be executed by the processor 1110; and the instruction modules that can be executed by the processor 1110 include: a receiving module 1121, an obtaining module 1122, and a sending module 1123, where, when being executed by the processor 1110, the receiving module 1121 may: receive a media information obtaining request sent by a client application; when being executed by the processor 1110, the obtaining module 1122 may: obtain first brief information and second brief information of a media file from a server based on the media information obtaining request received by the receiving module 1121; and when being executed by the processor 1110, the sending module 1123 may: send a notification message for the media file to the client application, so that the client application presents the first brief information at a first presentation position according to the notification message, and then presents the second brief information at a second presentation position, the media file being obtained and presented when an operation performed by a user on the second brief information is received.

In some embodiments, the instruction modules further include a storage module 1124. In some embodiments, when being executed by the processor 1110, the storage module 1124 may: store the first brief information and the second brief information into a buffer; and when being executed by the processor 1110, the sending module 1123 may: read the first brief information and the second brief information from the buffer, and generate the notification message.

Therefore, it can be seen that, when being executed by the processor 1110, the instruction modules stored in the memory 1120 can implement various functions of the receiving module, the obtaining module, the sending module, and the storage module in the foregoing embodiments.

Figure 12:
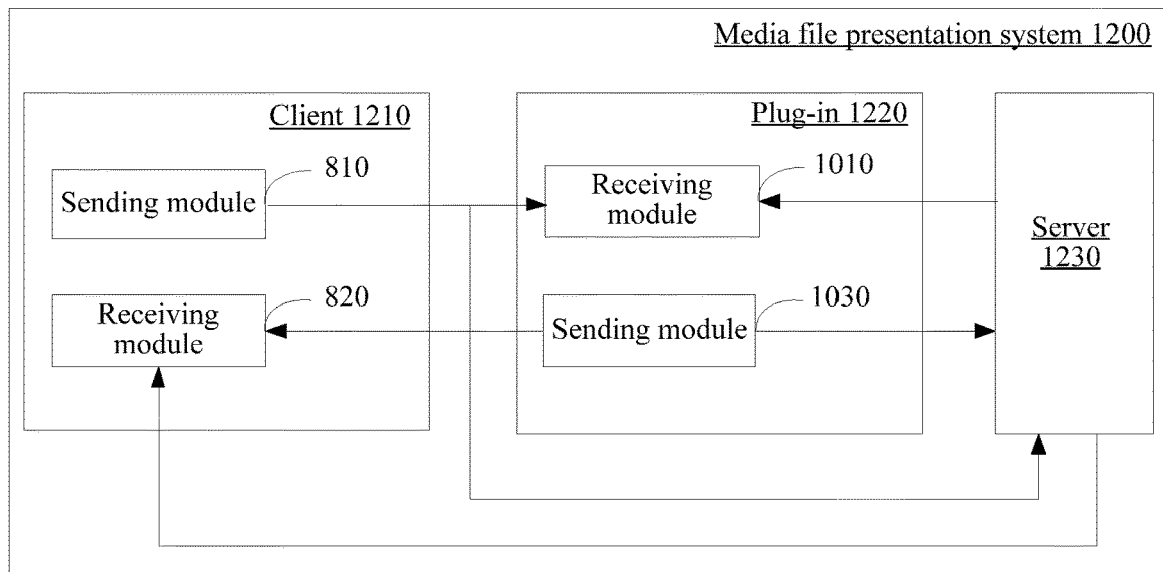
FIG. 12 shows a schematic composition diagram of a media file presentation system according to an embodiment of this application.

FIG. 12 shows a schematic composition diagram of a media file presentation system 1200 according to an embodiment of this application. The media file presentation system 1200 includes: a client application 1210, a plug-in 1220, and a server 1230, where, the client application 1210 is configured to: send a media information obtaining request to the plug-in 1220; receive a notification message for a media file from the plug-in 1220, present first brief information at a first presentation position according to the notification message, and then present second brief information at a second presentation position, where the media file is obtained and presented when an operation performed by a user on the second brief information is received; and the plug-in 1220 is configured to: receive the media information obtaining request sent by the client application 1210; obtain the first brief information and the second brief information of the media file from the server 1230 based on the media information obtaining request; and send the notification message to the client application 1210.

The client application 1210 may include the modules shown in FIG. 8, and the plug-in 1220 may include the modules shown in FIG. 10.

The following describes operations relating to interaction between the client application 1210, the plug-in 1220, and the server 1230, specifically as follows: sending, by the sending module 810 of the client application 1210, a media information obtaining request to the receiving module 1010 of the plug-in 1220; sending, by the sending module 1030 of the plug-in 1220, the media information obtaining request to the server 1230, and obtaining, by the receiving module 1010 of the plug-in 1220, first brief information and second brief information of the media file from the server 1230; sending, by the sending module 1030 of the plug-in 1220, a notification message to the receiving module 820 of the client application 1210; sending, by the sending module 810 of the client application 1210, a media file presentation request to the server 1230 in response to an operation performed on the second brief information by a user; and receiving, by the receiving module 820 of the client application 1210, a link address that is of the media file and that is returned by the server 1230.

Specific methods used by the modules and units in the foregoing apparatus and system embodiments to implement functions of the modules and units are all described in the method embodiments. Details are not described herein again.

In addition, functional modules in the embodiments of this application may be integrated into one processing unit, or each of the modules may exist alone physically, or two or more modules are integrated into one unit. The integrated unit may be implemented in a form of hardware, or may be implemented in a form of a software functional unit.

In addition, each embodiment of this application may be implemented by a data processing program that is executed by a data processing device such as a computer. Apparently, the data processing program constitutes this application. In addition, generally a data processing program stored in a storage medium is executed by directly reading the program from the storage medium or by installing or copying the program to a storage device (such as a hard disk or memory) of a data processing device. Therefore, such a storage medium also constitutes this application. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, this application further discloses a storage medium, which stores a data processing program. The data processing program may be executed by a processor to cause the processor to implement any embodiment of the foregoing method, processes, or other features described herein.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A media file presentation method, the method comprising:
   sending, by a computing device running a client application, a media information request to a plug-in running as part of the client application, wherein the plug-in operates to obtain a first brief information and a second brief information of a media file from a server; and
   receiving, from the computing device running the plug-in, a notification message corresponding to the media file;
   presenting, on the computing device, the first brief information in a full-screen interface according to the notification message for a first presentation duration;
   in response to ending the presenting of the first brief information at an end of the first presentation duration, switching, on the computing device, from the full-screen interface to a main interface, and presenting, in a portion of the main interface located at a second presentation position on the computing device, the second brief information, the portion of the main interface smaller than the full-screen interface;
   sending, to the server, a media file presentation request; and
   presenting, on the computing device, the media file received from the server when an operation input on the second brief information is received.

2. The method according to claim 1, wherein the notification message includes buffer addresses of the first brief information and the second brief information, further comprising:
   reading the first brief information from the notification message and presenting the first brief information; and
   obtaining the second brief information according to the buffer address and presenting the second brief information after the first brief information is presented.

3. The method according to claim 1, wherein the notification message comprises the first presentation duration of the first brief information and second presentation duration of the second brief information;
   wherein presenting the second brief information comprises:
   presenting the second brief information according to the second presentation duration.

4. The method according to claim 1, further comprising:
   outputting, when the first brief information is presented, at the first presentation position by using a floating layer or an option for prompting presentation of the media file, wherein:
   when an operation input corresponding to the option for prompting presentation of the media file is received, obtaining the media file, presenting the media file, and no longer presenting the second brief information; or
   when an operation input corresponding to the option for prompting presentation of the media file is not received, presenting the second brief information at the second presentation position after the first brief information is presented.

5. The method according to claim 1, further comprising:
   receiving setting information of the second presentation position from the plug-in, and determining the second presentation position on the main interface of the client application according to the setting information.

6. A media file presentation method, implemented by a processor executing instructions corresponding to a plug-in installed in a client application, the method comprising:
   receiving, by the plug-in running on a computing device, a media information request sent by the client application;
   obtaining, from a server, a first brief information and a second brief information corresponding to a media file; and
   sending, to the client application, a notification message corresponding to the media file, wherein, according to the notification message, the client application presents the first brief information in a full-screen interface for a first presentation duration, and in response to the first presentation duration ending, presents the second brief information in a portion of a main interface located at a second presentation position, the portion of the main interface smaller than the full-screen interface; and controlling presentation of the media file on the computing device when an operation performed by a user on the second brief information is received.

7. The method according to claim 6, further comprising:
storing the first brief information and the second brief information into a buffer; and
wherein sending the notification message corresponding to the media file comprises:
reading the first brief information and the second brief information from the buffer, and generating the notification message.

8. The method according to claim 7, wherein the notification message carries buffer addresses of the first brief information and the second brief information, so that the client application reads the first brief information from the notification message and presents the first brief information, and then obtains the second brief information according to the buffer address and presents the second brief information.

9. The method according to claim 6, wherein obtaining the first brief information and the second brief information corresponding to the media file comprises:
receiving, from the server, a link address of the first brief information and a link address of the second brief information;
obtaining the first brief information from the server according to the link address of the first brief information; and
obtaining the second brief information from the server according to the link address of the second brief information.

10. A non-transitory storage medium configured to store processor-executable instructions corresponding to a client application that, when executed by a processor of a computing device, cause the processor to:
send, by the computing device, a media information request to a plug-in running as part of the client application running on a computing device, wherein the plug-in operates to obtain a first brief information and a second brief information of a media file from a server; and
receive, from the computing device running the plug-in, a notification message corresponding to the media file;
present, on the computing device, the first brief information in a full-screen interface according to the notification message for a first presentation duration;
in response to an end of the first presentation duration, switch, on the computing device, from the full-screen interface to a main interface, and present, in a portion of the main interface located at a second presentation position on the computing device, the second brief information, the portion of the main interface smaller than the full-screen interface;
send, to the server, a media file presentation request; and
present, on the computing device, the media file when an operation input on the second brief information is received.

11. The non-transitory storage medium according to claim 10, wherein the notification message carries buffer addresses of the first brief information and the second brief information; and
wherein the processor-executable instructions corresponding to the client application, when executed by the processor, cause the processor to present the first brief information by reading the first brief information from the notification message and presenting the first brief information, and present the second brief information by obtaining the second brief information according to the buffer address and presenting the second brief information after the first brief information is presented.

12. The non-transitory storage medium according to claim 10, wherein the notification message comprises the first presentation duration of the first brief information and second presentation duration of the second brief information; and
wherein the processor-executable instructions corresponding to the client application, when executed by the processor, cause the processor to present the second brief information according to the second presentation duration.

13. The non-transitory storage medium according to claim 10, wherein the processor-executable instructions corresponding to the client application, when executed by the processor, further cause the processor to:
output, when the first brief information is presented, at the first presentation position by using a floating layer or an option for prompting presentation of the media file, wherein:
when an operation input corresponding to the option for prompting presentation of the media file is received, obtain the media file, presenting the media file, and no longer presenting the second brief information; or
when an operation input corresponding to the option for prompting presentation of the media file is not received, present the second brief information at the second presentation position after the first brief information is presented.

14. The non-transitory storage medium according to claim 10, wherein the first presentation position is a full-screen interface of the client application; and
wherein the processor-executable instructions corresponding to the client application, when executed by the processor, cause the processor to present the second brief information at the second presentation position by receiving setting information of the second presentation position from the plug-in, and determining the second presentation position on the main interface of the client application according to the setting information.

* * * * *